United States Patent [19]
Duhaime et al.

[11] Patent Number: 5,127,432
[45] Date of Patent: Jul. 7, 1992

[54] FUEL TANK RESERVOIR

[75] Inventors: Daniel M. Duhaime, Bloomfield Hills; James P. Hyde, Saline, both of Mich.

[73] Assignee: Ford Motor Company, Dearborn, Mich.

[21] Appl. No.: 760,787

[22] Filed: Sep. 16, 1991

[51] Int. Cl.5 .......................... B65D 1/24; B29C 49/00
[52] U.S. Cl. .................................. 137/574; 137/576; 220/563
[58] Field of Search ............... 137/574, 576, 571, 262; 251/127; 220/22, 562, 563

[56] References Cited

U.S. PATENT DOCUMENTS

| | | | |
|---|---|---|---|
| 3,122,157 | 2/1964 | Mukherji | 137/262 |
| 3,207,203 | 12/1963 | Mack . | |
| 4,453,564 | 6/1984 | Bergesio | 137/574 |
| 4,526,286 | 7/1985 | Jung et al. | 220/22 |
| 4,708,170 | 11/1987 | Bailey | 220/22 |

Primary Examiner—Martin P. Schwadron
Assistant Examiner—Kevin L. Lee
Attorney, Agent, or Firm—Damian Porcari; Roger L. May

[57] ABSTRACT

The present invention provides a fuel tank comprising a generally planar fuel tank bottom and upstanding wall on the fuel tank bottom. A passage within the wall has a throat area for admitting fuel to the reservoir. A baffle attached to the wall and placed adjacent the throat area deflects fuel away from the passage. The reservoir is designed to contain a first minimum quantity of fuel when the vehicle is approximately level and a second minimum quantity of fuel when the vehicle is inclined, the second quantity of fuel being roughly one-third the first minimum quantity of fuel. The reservoir acts to confine fuel within an area to be withdrawn by a fuel pump or pick-up nozzle and supplied to an engine.

8 Claims, 4 Drawing Sheets

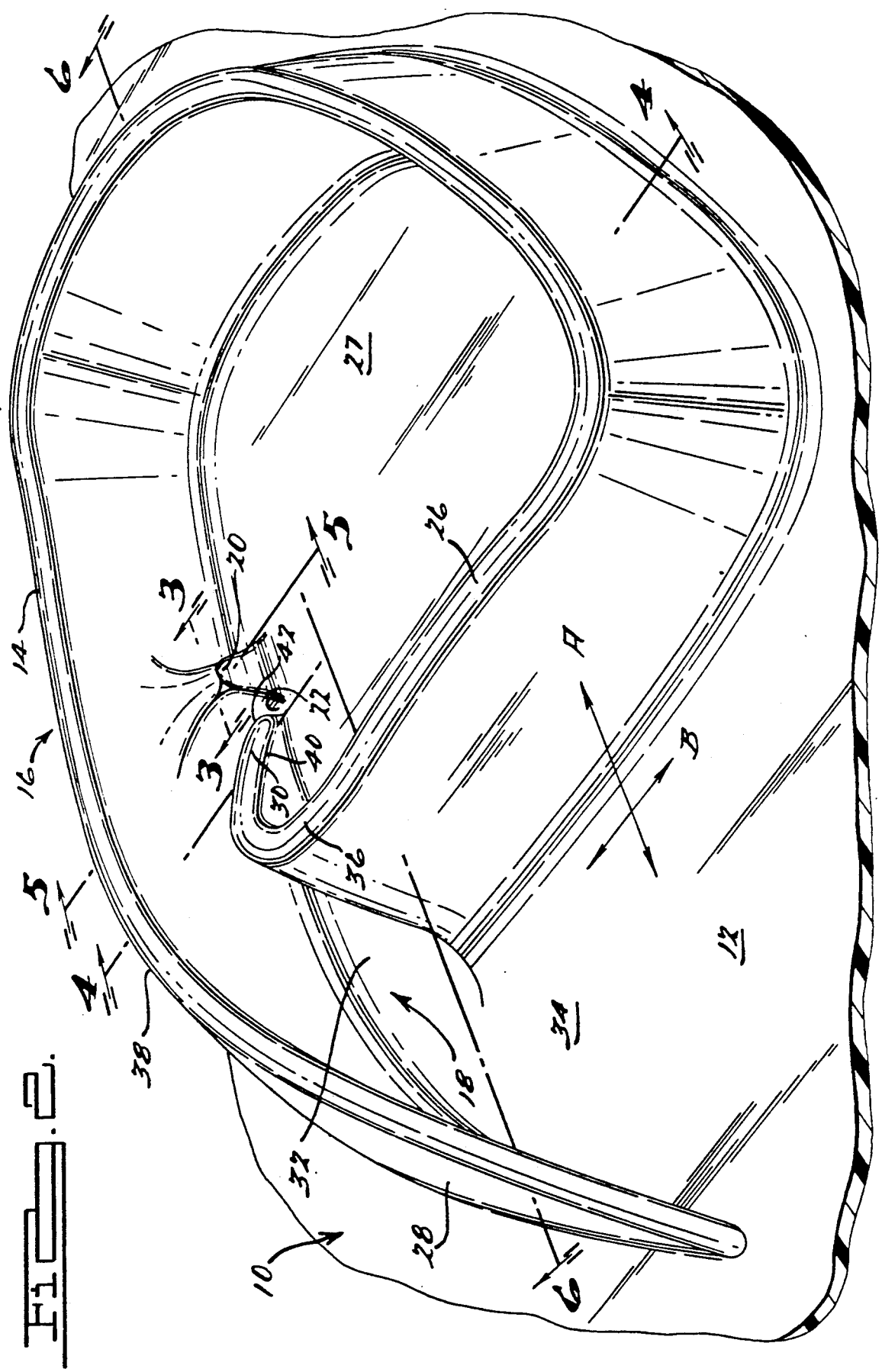

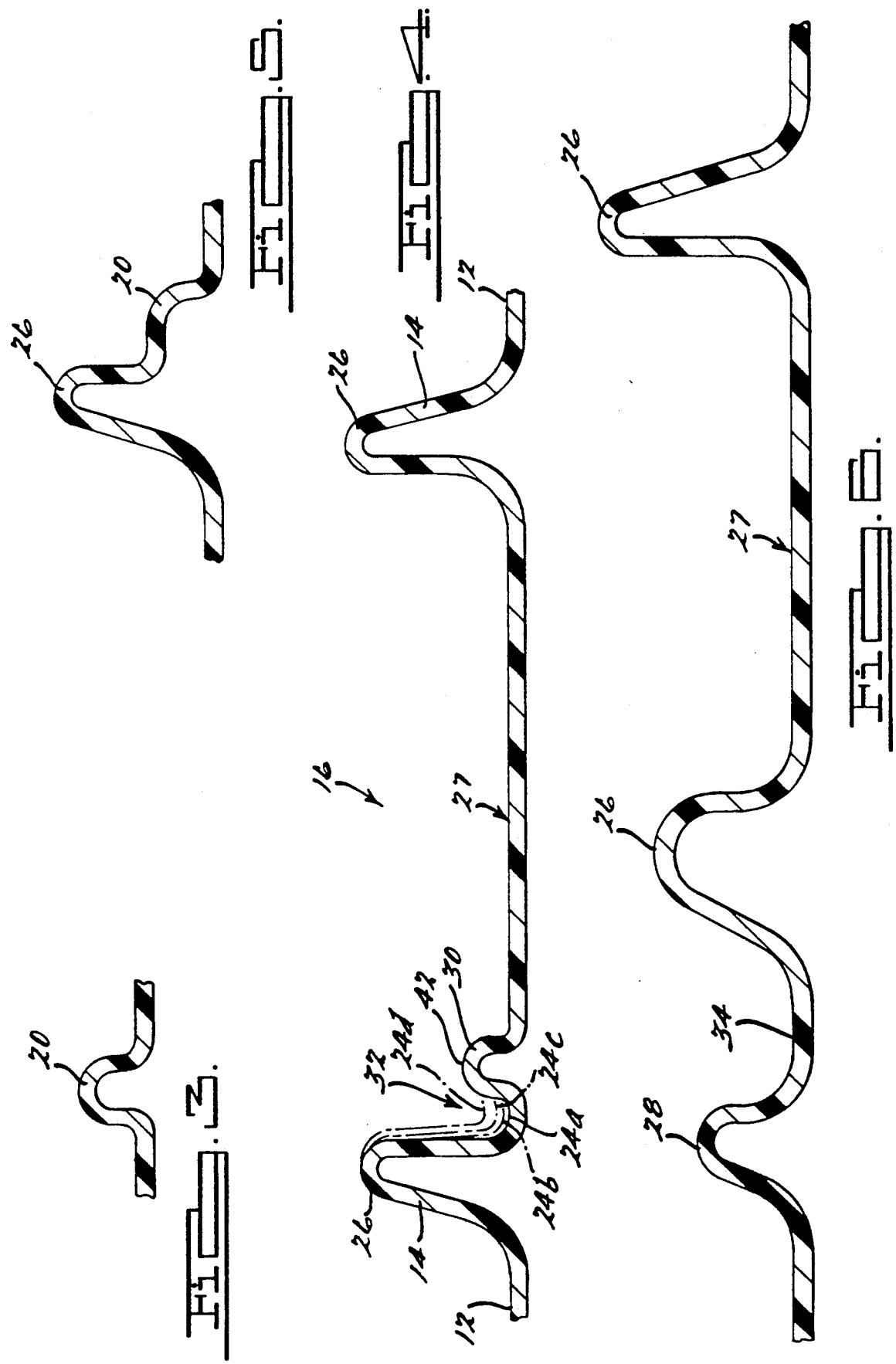

FUEL TANK RESERVOIR

This invention generally relates to motor vehicle fuel tanks comprising a unitary fuel reservoir adapted to cooperate with an in-tank fuel sender assembly.

BACKGROUND OF THE INVENTION

Fuel tanks for motor vehicles generally have a reservoir or baffle to contain a minimum amount of fuel. These reservoirs and baffles are useful for concentrating fuel for delivery to an engine by a fuel pump or fuel pick-up tube. The reservoirs are shaped to contain a volume of fuel when the tank is relatively empty.

In addition to a reservoir, vehicle fuel tanks often are provided with baffles which are useful in preventing fuel from flowing to an area remote from the fuel pump or fuel pick-up tube when the vehicle is on an incline or changing direction or speed. Both reservoirs and baffles are useful in preventing fuel starvation to the engine.

Various types of reservoirs and baffles are known in the art. U.S. Pat. No. 4,526,286 teaches a molded plastic fuel tank having an integral splash baffle. Walls are molded on mutually opposite sides of the fuel tank and are joined to one another. An opening in the wall permits the flow of fuel through to an area confined by the splash baffle. A nonreturn valve may be attached to the baffle at the opening to prevent fuel from spilling out of the splash baffle area as the vehicle accelerates.

U.S. Pat. No. 4,453,564 teaches a plastic fuel tank having C-shaped baffles molded therein. The baffles are molded into both an upper and lower half-shell and then welded together.

U.S. Pat. No. 4,708,170 teaches the molding of a fuel reservoir having two C-shaped projections on one wall of a fuel tank. A parison is extruded within a molding chamber having a die conforming to the reservoir shape. The parison is inflated and takes the shape of the die. The reservoir is integrally formed within the fuel tank walls.

It is desirable for a fuel tank to have a reservoir and integral splash baffle. The reservoir should confine a minimum amount of fuel when the vehicle is on an incline in any direction or when the vehicle has undergone acceleration, deceleration, or a change of direction.

SUMMARY OF THE INVENTION

The present invention provides a fuel tank comprising a generally planar fuel tank bottom and an upstanding wall on the fuel tank bottom. The wall forms a reservoir area for containing fuel. A passage within the wall has a throat area for admitting fuel to the reservoir. A baffle attached to the wall and placed adjacent the throat area deflects fuel away from the passage.

The reservoir acts to confine fuel within an area to be withdrawn by a fuel pump or pick-up tube and supplied to an engine. The reservoir is designed to contain minimum quantities of fuel, regardless of the orientation of the vehicle, that is, regardless of whether the vehicle is on level ground, climbing or descending a hill, accelerating, decelerating, or traveling around a corner.

In the preferred embodiment of this invention, the reservoir wall was three wall sections integrally molded with the fuel tank. The wall sections encircle a reservoir area for retaining fuel. Portions of the wall are in overlapping, juxtaposed relationship and form a shell or spiral shape. A first wall section generally defines the reservoir area confining a quantity of fuel. A second wall section extends away from the reservoir area and retains fuel when the vehicle is inclined along a transverse vehicle axis, such as would occur when going down a hill. A third wall acts to retain fuel within the reservoir when the vehicle is inclined along a longitudinal vehicle axis with the right side elevated. Directions such as uphill or right-side are based on the orientation of the invention in the fuel tank. Rearrangement of the invention reorients the relative terms of uphill or right-side.

A baffle attached to the first wall section acts to deflect fuel within the reservoir area as the vehicle is inclined along the longitudinal axis with the right side elevated.

An inlet passage defined by overlapping sections of the wall admits fuel to the reservoir area. Located between the baffle and the third wall section is a throat communicating with the passage. The passage has a threshold with a height approximately level with or slightly above the fuel tank bottom. The threshold height in part determines the quantity of fuel remaining in the reservoir. This threshold height may be easily changed to adapt the reservoir for applications requiring greater or lesser minimum fuel volumes.

The preferred embodiment of the invention contemplates the blow-molding of a fuel tank having an integrally molded reservoir therein. A parison of moldable plastic material, preferably polyethylene, is extruded within a die having the reservoir shape formed therein. The parison is inflated and forced to conform to the shape of the die. After the parison cools, the molded fuel tank is removed.

The present invention provides an easily manufacturable and low-cost fuel tank having a reservoir which permits the retention of fuel as the vehicle is inclined or driven. A splash baffle and the reservoir shape retain fuel in a confined area for delivery to a fuel pump or pick-up tube as the vehicle accelerates, decelerates, or corners. The invention provides an easily modifiable threshold design permitting adaptation for a variety of minimum reservoir volumes. These and other objects, features, and advantages of the present invention will become more apparent upon reference to the following detailed description and drawings.

BRIEF DESCRIPTION OF THE DRAWINGS

FIG. 2 is a perspective view showing the bottom of the tank having an integral fuel reservoir.

FIG. 3 is a cross-sectional view of the fuel reservoir shown in FIG. 2, taken along the lines 3—3.

FIG. 4 is a cross-sectional view of the fuel reservoir shown in FIG. 2, taken along the lines 4—4.

FIG. 5 is a cross-sectional view of the fuel reservoir shown in FIG. 2, taken along the lines 5—5.

FIG. 6 is a cross-sectional view of the fuel reservoir shown in FIG. 2, taken along the lines 6—6.

DETAILED DESCRIPTION OF THE PREFERRED EMBODIMENT

Figure 1:
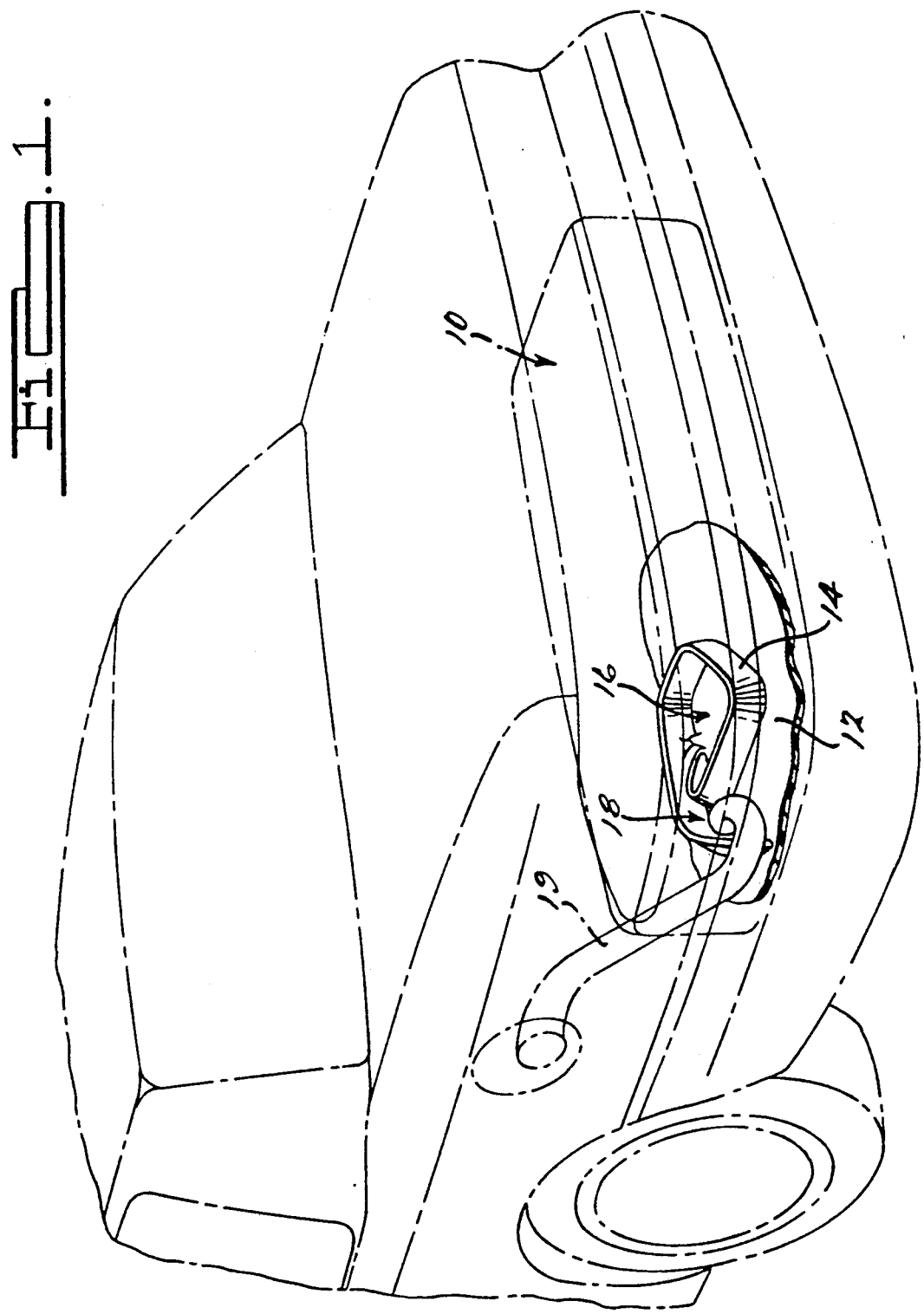
FIG. 1 is a perspective view of a vehicle in phantom lines having a fuel tank with an integral reservoir.

FIG. 1 shows the rear portion of an automobile in phantom lines having a fuel tank with an integral reservoir in accordance with the preferred embodiment of the present invention. A plastic fuel tank 10 is generally located in the rear section of the vehicle. Integrally molded with fuel tank bottom 12 is upstanding wall 14 that defines a reservoir 16. Passage 18, defined by overlapping portions of wall 14, admits fuel to reservoir 16. The purpose of the reservoir is to concentrate the remaining fuel in a fuel tank for delivery to an engine. Reservoirs also act to restrain the movement of fuel within the tank while the vehicle is changing direction or speed. Unrestrained fuel movement may starve the engine of fuel, or provide inaccurate reading by a fuel level sensor.

FIG. 2 is a perspective view of the fuel tank 10 and reservoir 16 shown in FIG. 1. Fuel tank 10 is shown broken-away and reservoir 16 is shown unitary. Plastic fuel tank 10 has a generally flat bottom 12. Integral with bottom 12 is upstanding wall 14. Wall 14 collects fuel within fuel tank 10. Wall 14 has three wall sections 26, 28, 30 arranged in a generally spiral fashion defining reservoir 16. In the preferred embodiment of the invention, the wall sections are manufactured to be integral within one another and are formed from a single parison material. Wall 14 may alternatively be manufactured in three or more pieces and assembled to form reservoir 16.

The wall sections form a generally shell-shaped enclosure, but the enclosure may be square, circular, oval, triangular, or irregularly shaped. First wall section 26 is generally circular and defines the main reservoir area 27. First wall section 26 has a first end 36 and a second end 38. Second wall section 28 is slightly curved and is attached to second end 38 of first wall section 26. Second wall section 28 generally extends beyond the perimeter of the main reservoir area 27.

The area between second wall section 28 and first wall section 26 forms well 34 that functions as an area retaining fuel when the vehicle is inclined along a transverse vehicle axis A, such as would occur when going down a hill. Second wall section 28 has a height equal to wall section 26 at one end and tapers down to the surface of the fuel tank bottom 12 at its terminal end.

Attached to first end 36 of first wall section 26 is third wall section 30. Third wall section 30 is spaced concentric to and spatially within second end 38 of first wall section 26. Third wall section 30 comprises first end 40 and second end 42. First end 40 is attached to first end 36 and second end 42 extends within reservoir 16 and concentric with first wall section 26. First end 40 tapers from a height equal to first end 36 to second end 42 which has a height slightly above the fuel tank bottom.

Splash baffle 20 is attached to first wall section 26 and extends radially within reservoir 16 a distance approximately even with third wall section 30. In the preferred embodiment of the invention, baffle 20 is integral with first wall section 26. Baffle 20 is spaced apart from second end 42. The space between second end 42 and splash baffle 20 defines throat 22. The space between third wall section 30 and first wall section 26 defines raceway 32. Throat 22, raceway 32, and well 34 all comprise passage 18 and permit fuel to enter reservoir area 27 from fuel tank 10. Passage 18 supplies fuel to reservoir 16 when the fuel level in fuel tank 10 is below the height of wall 14.

The configuration and height of wall 14 is based in part on the overall fuel tank height and the type of fuel pump or pick-up tube used. Tall fuel tanks (i.e., fuel tanks having a height greater than their width) generally permit a smaller reservoir area 27 by using a taller wall. Thin fuel tanks (i.e., fuel tanks having a width greater than their height) generally require a larger reservoir area and permit a lower wall. The volume of wall 14 is minimized to permit fuel tank 10 to contain a maximum quantity of fuel. Also, when molding fuel tanks from plastic material, a tall wall is more difficult to form by blow-molding than a lower wall. A lower wall and a larger reservoir area are also useful when using an inclined fuel sender unit and bracket of the type shown and described in U.S. application Ser. No. 088,220, entitled "Fuel Pump and Sender Assembly", incorporated herein by reference. Vertical fuel senders are more suited for taller walled reservoirs.

The fuel filler pipe shown in FIG. 1 dispenses fuel directly to passage 18. This permits an engine to restart after empty using a small quantity of fuel. Fuel filler pipe 19 is angled to direct fuel toward passage 18. Although the reservoir described may be placed in any position within the fuel tank, preferred is with passage 18 pointing toward the side of the vehicle. Shown is fuel tank 10 positioned to have passage 18 generally facing the left-rear side of the vehicle. It is preferred that passage 18 be located on the same side of the vehicle as fuel filler pipe 19. When the fuel tank is emptied to the point where the fuel pump or pick-up tube is not operable, a small quantity of fuel can be added to the tank through filler pipe 19 and becomes concentrated in reservoir 16. Reservoir 16 should be at the lowest level of the tank when the vehicle is level to receive all the available fuel.

FIGS. 3-6 are cross-sectional views of reservoir 16. FIG. 3 is a cross-sectional view of the splash baffle 20 taken along the lines 3—3 in FIG. 2. FIG. 4 is a cross-sectional view of reservoir 16 taken along the lines 4—4 in FIG. 2. Wall 14 forms fuel reservoir 16. First wall section 26 rises to a height above the fuel tank bottom 12. Third wall section 30 is spaced concentric to and within first wall section 26. Third wall section 30 tapers at second end 42 to a height slightly above fuel tank bottom 12. Raceway 32 is contained between first wall section 26 and third wall section 30. Raceway 32 has a threshold height 24a which determines the amount of fuel remaining in the reservoir as the fuel tank empties. The fuel remaining in the tank below the level of the fuel pump or pick-up tube is called "dead fuel" because it is not available for the engine. This dead fuel often is concentrated with contaminants or water. It is often desirable not to use this fuel in a fuel pump or engine because of its harmful effects. Reservoir 16 would be manufactured with a threshold height specific to the requirements of a vehicle.

Shown as solid line 24a, is the lowest threshold height which is approximately level with the fuel tank bottom. This height retains the least amount of dead fuel within the tank. In the embodiments developed by applicants, threshold height 24a retains approximately 1.5 liters of dead fuel in reservoir 16 when fuel tank 10 is level. Threshold height 24b was found to retain approximately 1.6 liters of dead fuel, threshold height 24c was found to retain approximately 1.7 liters of dead fuel, and threshold height 24d was found to retain approximately 1.8 liters of dead fuel. Only slight modifications of the tooling permits manufacture of a fuel tank with a different threshold height.

It should be noted that fuel tank 10, bottom 12, and wall 14 are preferably made of a single blow-molded material; however, reservoir 16 may be fabricated separately and subsequently attached to a fuel tank. It is also possible to form fuel tank 10 or reservoir 16 by injection or compression molding. It is preferred to form fuel tank 10 from a thermoformable material, but thermoset materials or even steel may be used.

The preferred embodiments of the fuel tank shown in FIGS. 1-6 is manufactured by blow-molding. A mold having a die in the shape of reservoir 16 is provided. A hollow parison of pliable polymeric material is extruded within the mold. The mold and die are closed to seal the periphery of the parison. The parison is inflated and forced to take the shape of the die. The parison closely conforms to the die and is permitted to cool. The finished article is removed from the mold for further processing and assembly into a vehicle. A variety of materials are useful in blow-molding applications, but specifically preferred for automotive fuel tanks is high density polyethylene.

Projections within a die (not shown) form threshold heights 24a-d. When using thermoplastic material, such as polyethylene, the threshold height of the cooled tank was found to be slightly higher than would otherwise be expected from the die shape; this was due to shrinkage of the plastic. To account for this shrinkage, the die should be slightly undercut, or made deeper, to compensate for plastic shrinkage. This would not be a factor if reservoir 16 is made from a material that does not shrink when cooled.

Operation

When fuel tank 10 is full, reservoir 16 is submerged beneath the fuel. As the fuel tank empties, wall 14 is above the level of the fuel. When the fuel tank is nearly empty, a quantity of dead fuel, generally about 1.5 liters, remains within reservoir 16 when the vehicle is approximately level. As stated previously, the amount of fuel remaining in the reservoir is determined by threshold height 24a-d. Reservoir 16 also acts to concentrate the remaining fuel for delivery to a fuel pump as the vehicle undergoes acceleration, deceleration, cornering, or when the vehicle is on an incline.

Figure 7A:
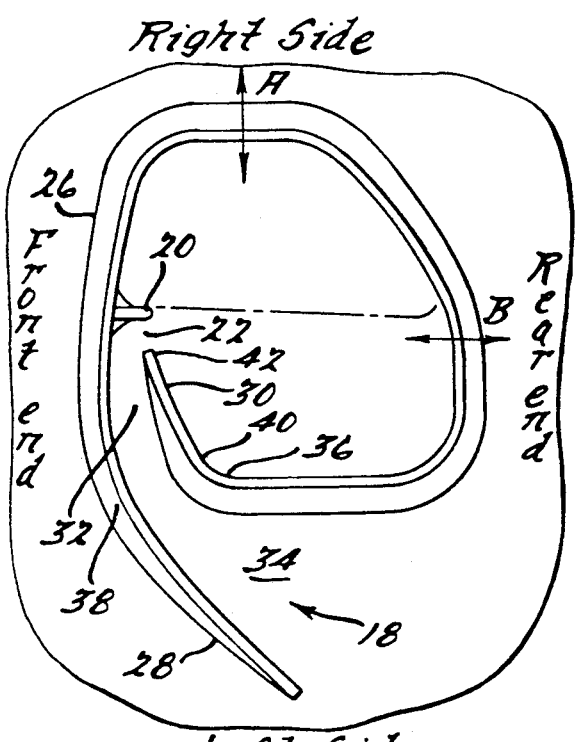
FIGS. 7a-7d are plan views of the fuel reservoir showing fuel remaining in the reservoir as the fuel tank is inclined.

Shown in FIGS. 7a-7d, are plan views of reservoir 16 showing the fuel remaining in reservoir 16 as the vehicle is inclined or driven. FIG. 7a shows the fuel remaining within reservoir 16 when the vehicle is inclined about longitudinal vehicle axis B with the left side higher than the right side or while the vehicle is cornering toward the left. Fuel enters reservoir 16 through passage 18 and excess fuel spills over first wall section 26. A similar situation exists when the vehicle is cornering to the left. The inertia of the remaining fuel in reservoir 16 forces a wave of fuel toward the right of the vehicle. The wave of fuel rebounds against first wall section 26 and is contained within reservoir 16 when the vehicle returns to a level or straight condition.

Figure 7B:
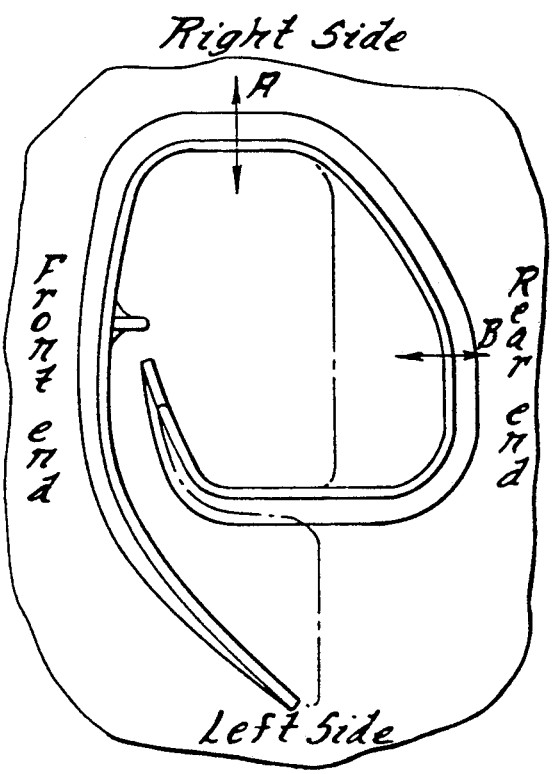

FIG. 7b illustrates the fuel remaining in reservoir 16 when the vehicle is inclined about transverse vehicle axis A with the rear end higher than the front end, such as when the vehicle is descending a hill or when the vehicle is undergoing deceleration. The fuel enters passage 18 and partially concentrates in well 34. Second wall section 28 contains fuel in well 34 and makes it available to the fuel sender or pick-up.

Figure 7C:
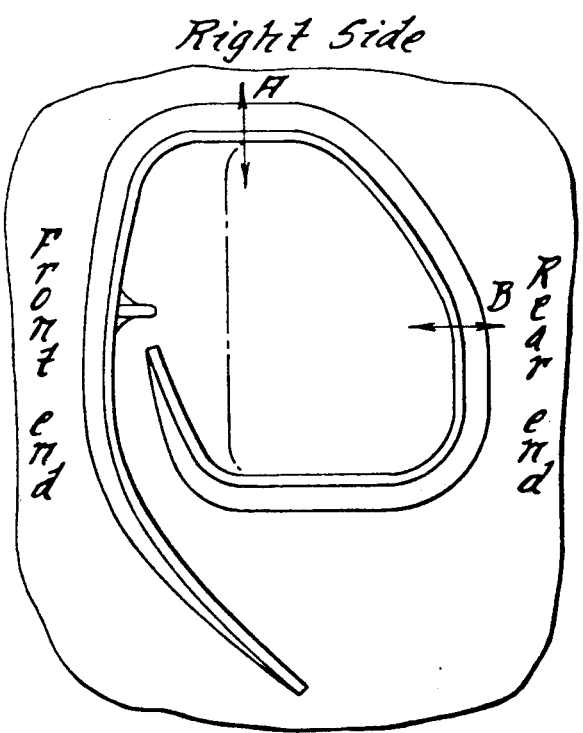

FIG. 7c illustrates the remaining fuel in reservoir 16 when the vehicle front end is inclined along axis A with the front end higher than the rear end, such as when a vehicle is climbing a hill or when the vehicle is undergoing acceleration.

Figure 7D:
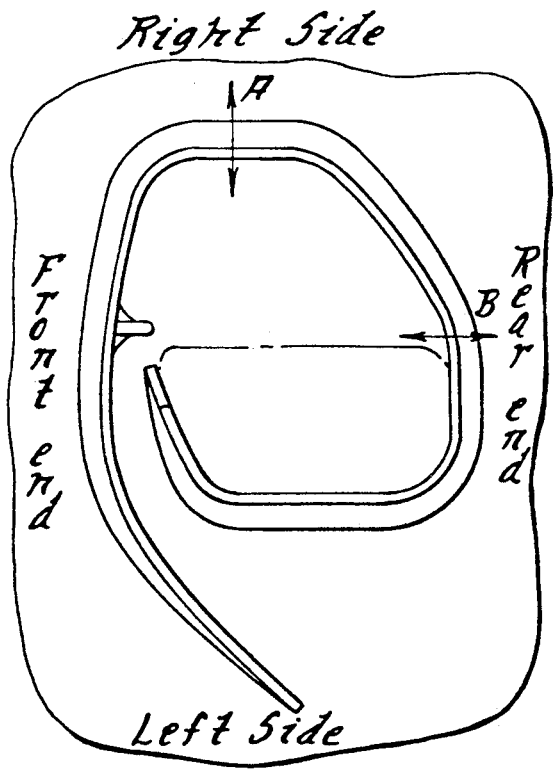

FIG. 7d illustrates the fuel remaining in reservoir 16 when the vehicle is inclined about axis B with the right side higher than the left side or while the vehicle is cornering toward the right Baffle 20 deflects the return wave of fuel from flowing out into passage 18. The volume of fuel remaining in reservoir 16 is determined by the height of first wall section 26 with respect to the fuel tank bottom. It is desirable that 400 ml or more of fuel remain in reservoir 16 under any of the above-identified conditions.

Fuel moving within reservoir 16 is generally described as "slosh". Fuel slosh is generally contained within reservoir 16 by wall 14 and baffle 20. Fuel moving from the right side of the vehicle to the left side of the vehicle is prevented from spilling out of the reservoir by baffle 20. Baffle 20 directs fuel away from throat 22 and raceway 32. Fuel moving from the left side of the vehicle to the right side of the vehicle is also directed away from throat 22 by third wall section 30. Fuel slosh induced by incline, acceleration, deceleration, or cornering remains confined within reservoir 16.

The invention has been described as an integrally molded reservoir in a fuel tank. The reservoir may be made from separate pieces and placed within a plastic or metal fuel tank. It should be understood that these and other modifications to preferred embodiments can be used without departing from the scope of the invention. The claims appended hereto are intended to cover all such changes and modifications.

We claim:

1. A fuel tank comprising:
   a generally planar fuel tank bottom;
   a generally upstanding wall open said bottom, said wall forming a reservoir for retaining fuel;
   a passage within said wall, said passage having a throat area for admitting fuel to said reservoir;
   said wall having first, second and third wall sections, said first wall section enclosing a reservoir area, said second wall section extending along said passage to a point remote from said area, said first and second wall sections forming a well communicating with said passage and containing a second volume of fuel within said well and said area when said tank is inclined about a first axis, said third wall section being attached to said first wall section and extending within said area, said third wall section cooperates with said first wall section to contain said second volume of fuel within said area when said tank is inclined about a second axis; and
   a baffle attached to said wall adjacent said throat area, said baffle deflecting fuel away from said throat area.

2. The fuel tank of claim 1, wherein said first volume of fuel is approximately three times said second volume.

3. The fuel tank of claim 1, wherein said second and third wall slope form a height above said fuel tank bottom to a height approximately level with said fuel tank bottom.

4. A fuel tank comprising:
   a generally planar fuel tank bottom;
   a generally upstanding wall on said bottom, said wall forming a reservoir for retaining fuel;
   a passage within said wall, said passage having a throat area for admitting fuel to said reservoir;
   said wall having first, second and third wall sections, said first wall section enclosing a reservoir area, said second wall section extending along said passage to a point remote from said area, said first and second wall sections forming a well communicating with said passage and containing a second volume of fuel within said well and said area when said tank is inclined about a first axis, said third wall section being attached to said first wall section and extending spirally within said first wall section; and a baffle attached to said wall adjacent said throat area, said baffle deflecting fuel away from said throat area.

5. A fuel tank for use in a motor vehicle having said tank comprising:

a generally planar fuel tank bottom;

a generally upstanding wall on said bottom, said wall having first, second and third wall sections forming a reservoir for retaining fuel;

a passage within said wall, said passage having a throat area for admitting fuel to said reservoir;

a baffle attached to said wall adjacent said throat area, said baffle deflecting fuel away from said throat area when said vehicle corners in a first direction and said third wall section deflecting fuel away from said throat area when said vehicle corners in a second direction.

6. A fuel tank for a motor vehicle, said vehicle having a front end, a rear end, a first side, and a longitudinal axis, said fuel tank comprising:

a generally planar fuel tank bottom;

a reservoir integrally molded within said fuel tank bottom, said reservoir having an upstanding wall for containing fuel between said wall and said bottom;

said wall having at least first, second, and third wall sections, said first wall section having a first end and a second end and enclosing an area, said first end of said first wall section being generally parallel to said vehicle axis and pointing toward said front end of said vehicle, said second end of said first wall section being generally perpendicular to said vehicle axis and pointing toward said first side of said vehicle said second wall section having a first end and a second end, said first end of said second wall section being attached to said second end of said first wall section and generally pointing between said rear end and said first side, said third wall section having a first end and a second end, said first end of said third wall section being attached to said first end of said first wall section and extending spirally within said second end of said first wall section;

a baffle extending from said first wall section generally parallel to said vehicle axis and ending adjacent the second end of said third wall section;

a throat area between said baffle and said second end of said third wall section, said baffle deflecting fuel away from said throat area when said vehicle is inclined along said vehicle axis with said first side lowered;

a raceway between said first and second wall and generally parallel with said vehicle axis, said raceway communicating with said throat area and said fuel tank and providing fuel to said reservoir;

a well between said third wall section and said first wall section, said well communicating with said raceway and retaining fuel when said fuel tank is inclined along an axis transverse to said vehicle axis with said front end lowered.

7. The fuel tank of claim 5, wherein said second and third wall slope form a height above said fuel tank bottom to a height approximately level with said fuel tank bottom.

8. The fuel tank of claim 6, wherein said fuel tank is made from polyethylene.

* * * * *